United States Patent
Chamberlain et al.

(10) Patent No.: US 6,386,126 B1
(45) Date of Patent: May 14, 2002

(54) SEED TREATMENT METHOD

(75) Inventors: Ronald D. Chamberlain, Terre Haute; Joseph Kordes, Loogootee, both of IN (US)

(73) Assignee: Platte Chemical Company, Greekley, CO (US)

(*) Notice: Subject to any disclaimer, the term of this patent is extended or adjusted under 35 U.S.C. 154(b) by 1155 days.

(21) Appl. No.: 08/816,756

(22) Filed: Mar. 7, 1997

Related U.S. Application Data

(63) Continuation of application No. 08/289,402, filed on Aug. 12, 1994, now abandoned.

(51) Int. Cl.$^7$ .......................... A01C 23/00; A01C 1/06; A01B 79/00; C05C 1/00
(52) U.S. Cl. .................. 111/120; 111/121; 111/124; 111/125; 111/126; 47/57.6; 47/58.1; 71/60; 71/61; 71/27; 71/54; 71/64.02; 71/64.03
(58) Field of Search ................... 111/120, 121, 111/124, 125, 126; 47/57.6, 58.1; 71/60, 61, 27, 54, 64.02, 64.03

(56) References Cited

U.S. PATENT DOCUMENTS

| | | | |
|---|---|---|---|
| 3,090,229 A | | 5/1963 | Ott .................................. 71/1 |
| 3,648,631 A | * | 3/1972 | Fiedler ........................ 111/120 |
| 3,653,550 A | * | 4/1972 | Williams ................. 111/129 X |
| 3,854,923 A | | 12/1974 | Ott ................................ 71/64 |
| 3,976,017 A | * | 8/1976 | Leffler ...................... 111/905 X |
| 3,976,030 A | * | 8/1976 | Ragsdale et al. ........ 111/905 X |
| 3,997,319 A | * | 12/1976 | Ott ................................ 71/27 |
| 4,145,980 A | * | 3/1979 | Boots ..................... 111/120 X |
| 4,352,688 A | | 10/1982 | Ott ................................ 71/11 |
| 4,356,934 A | * | 11/1982 | Knake .................... 111/905 X |

FOREIGN PATENT DOCUMENTS

| | | | | |
|---|---|---|---|---|
| SU | 865169 | * | 9/1981 | |
| SU | 0865169 | * | 9/1981 | ................ 111/905 |
| SU | 865189 | | 9/1987 | |

OTHER PUBLICATIONS

Label, "ACA Concentrate® 15–0–0, No. 34155," publ. Jan. 1992, Platte Chemical Co., Fremont, NE.
Label, "ACA Concentrate® 15–0–0, No. 34133," publ. Jan. 1992, Platte Chemical Co., Fremont, NE.
Label, "ACA Concentrate® 15–0–0, (Wisconsin)—No. 32292," publ. Jan. 1992, Platte Chemical Co., Fremont, NE.
"ACA Concentrate® 15–0–0 Material Safety Data Sheet," publ. Jan. 1992, Platte Chemical Co., Fremont, NE.
"ACA® Concentrate + N–Serve* Anhydrous Program" brochure, publ. on or before Sep. 1992, Grower Service Corp., Terre Haute, Indiana.
"ACA® Concentrate + N–Serve* Fall Anhydrous Program" brochure, publ. on or before Sep. 1992, Grower Service Corp., Terre Haute, Indiana.
"ACA® Concentrate Wheat Program" brochure, publ. on or before Sep. 1993, Grower Service Corp., Terre Haute, Indiana.
"RENU Nitrogen–Zinc Plant Nutrient Solution" label, publ. on or before Jan. 1993, T–Tech Corp., Chester, Virginia.
"Model 1005 Dispensing System" brochure, publ. on or before Jan. 1993, Economy Controls Corporation, St. Louis, Missouri.
"Help Your Crops Achieve Full Yield Potential—Ask for ACA® Concentrate" brochure, publ. on or before Jan. 1993, United Agri Products, Inc., Greeley, Colorado.
"ACA Impregnation System" brochure, publ. Jan. 26, 1993, Grower Service Corp., Terre Haute, Indiana.
"Increase Corn Yields Over the Winter" brochure, publ. on or before Jan. 1993, Midwest Valley Chemical, Wall Lake, Iowa.
"ACA Salesman Handbook", pp. 1–39, publ. on or before Nov. 1991, United Agri Products, Inc., Greeley, Colorado.
"Asset Plant Root Stimulator" label, publ. on or before Nov. 1992, Setre Chemical Co., Memphis, Tennessee.
"Asset Plant Root Stimulator" brochure, publ. on or before Nov. 1992, Setre Chemical Co., Memphis, Tennessee.
"Asset Results—1990 (Eastern Iowa)", Helena Agri–Dealer, publ. on or before Jul. 1992, Helena Chemical Company, Memphis, Tennessee.
"Root Stimulator Improves Standability Yield, Health Of soybean Crops ion Midwest", Helena Agri–Dealer, publ. on or before Jul. 1992, Helena Chemical Company, Memphis, Tennessee.
"Difference in Roots Stems From Asset", Helena Agri–Dealer, publ. on or before Jul. 1992, Helena Chemical Company, Memphis, Tennessee.

* cited by examiner

Primary Examiner—Ponnathapu Achutamurthy
Assistant Examiner—Tekchand Saidha
(74) Attorney, Agent, or Firm—Hogan & Hartson, LLP

(57) ABSTRACT

A method of stimulating root growth of seeds is disclosed in which seeds are treated with an effective amount of an aqueous ammoniacal ionic solution of metal alkanoates. Alkanoates having from 2 to 6 carbon atoms are preferred, with acetates most preferred. Metals selected from the group consisting of boron, calcium, copper, iron, magnesium, manganese, molybdenum, potassium, sodium and zinc are preferred, with zinc particularly preferred. In one embodiment, an aqueous ammoniacal ionic solution of zinc acetate is applied to seeds in-furrow. In another embodiment, seeds are treated with an aqueous ammoniacal ionic solution of zinc acetate prior to planting. In yet another embodiment, an aqueous ammoniacal ionic solution of zinc acetate is mixed with an insecticide and resulting solution applied to seeds in-furrow.

17 Claims, 8 Drawing Sheets

SEED TREATMENT METHOD

The present application is a file wrapper continuation application of U.S. patent application Ser. No. 08/289,402, filed Aug. 12, 1994 now abandoned.

FIELD OF THE INVENTION

This invention relates to a method of applying an aqueous ammoniacal ionic solution of metal alkanoates to seeds to stimulate early seedling growth. More particularly, this invention relates to a method of pretreating seeds with an aqueous ammoniacal ionic solution of metal alkanoates and of applying such solutions to seeds, in-furrow, at planting.

BACKGROUND OF THE INVENTION

Traditionally, substantially anhydrous liquid ammonia has been injected below the soil surface, under pressure, for use by growing plants as a source of nitrogen. Anhydrous liquid ammonia is typically applied in fall—after the end of the growing season, in early spring—prior to planting, or in late spring—post-emergence, i.e. after a crop has germinated and leafed out. While anhydrous liquid ammonia is readily assimilated by plants and thus is a preferred fertilizer, the pressurized injection methods conventionally used are not suitable for use under wet soil conditions. When weather conditions are unsuitable, growers may skip scheduled early spring, late spring or fall applications of anhydrous liquid ammonia. When this occurs, crop yields are likely to be reduced unless alternate forms of nitrogen application are used.

Plant activants and other fertilizers and materials are sometimes combined with anhydrous ammonia to form augmented solutions for application to the soil with the anhydrous ammonia to further enhance plant growth and increase crop yields. U.S. Pat. No. 3,909,229 for "Plant Nutrients" to Ott, incorporated herein by reference, teaches aqueous ammoniacal ionic solutions of zinc carboxylates, for example zinc acetate in combination with ammonia, as effective fertilizers. U.S. Pat. No. 3,997,319 for "Fertilizing Method" to Ott, incorporated herein by reference, teaches the application to soil below the surface of the soil, a substantially anhydrous liquid ammonia containing an ionic solution of a zinc carboxylate. This method supplies both zinc and nitrogen to plants growing in the soil. Zinc acetate is disclosed in this patent as a suitable zinc carboxylate. U.S. Pat. No. 4,352,688 for "Nitrogen Fertilizers" to Ott, also incorporated herein by reference, teaches that low molecular weight alkanoic acids and alkanoate anions, particularly acetic acid and acetate ions, effectively promote plant growth and yield by enhancing the ability of nitrogen fertilizers.

As disclosed in the above-identified patents, alkanoic acids and alkanoate anions, for example metal ammonium alkanoates and zinc ammonium acetate, are applied in conjunction with anhydrous ammonia, often by injection under pressure. When employing this application technique, application of the alkanoic acid and/or alkanoate anion depends upon successful application of the anhydrous ammonia. If weather conditions are unsuitable for application of the anhydrous ammonia, crops growing in or to be planted in the soil to which the anhydrous ammonia was to be applied may forego both needed nitrogen and plant growth stimulation afforded by the alkanoic acid or alkanoate.

When a scheduled application of an anhydrous ammonia/alkanoic acid or alkanoate combination is missed, a dried or liquid fertilizer containing the alkanoic acid or alkanoate is sometimes applied as a pre-emergence or side dressing. However, the effectiveness of side dressing techniques on growing plants is typically not as great as when a fertilizer is applied closer to the plant roots.

One agricultural crop additive of the class of aqueous ammoniacal ionic solutions of metal alkanoates described above is commercially available under the ACA® Concentrate 15-0-0 trademark from Platte Chemical Company of Fremont, Nebraska. ACA® Concentrate 15-0-0 is an aqueous ammoniacal ionic solution of zinc acetate. ACA® us currently available as a liquid containing approximately 15% by weight ammoniacal nitrogen and approximately 17% by weight zinc (hereinafter "ACA®"). ACA® is typically applied at a rate of from ⅓ to ⅔ pint per acre, preferably ½ pint to ⅔ pint per acre. Application of alkanoates at these low rates is generally understood to require application of the alkanoate in conjunction with a liquid carrier, such as anhydrous ammonia or a nitrogen fertilizer solution. This requirement derives from the relatively high viscosity of aqueous ionic solutions of metal alkanoates such as ACA® and the inability of planting equipment to deliver such fluids at the desired lower flow rates.

Because of the concentrated character of many nitrogen fertilizers, including pressured anhydrous ammonia, care is taken to avoid applying these fertilizers directly to the roots of growing plants or in contact with newly planted seeds. Instead, these fertilizers are conventionally applied a distance from the plant roots. For example, ACA®, when mixed with liquid or dry granular fertilizer and applied as a starter simultaneously with the planting of corn seeds, is typically applied 2" or more to the side of a furrow in which the seeds are placed and 2" or more below the level of the seeds in the furrow. By distancing the fertilizer/alkanoate mixture from the corn seeds, the seeds are not burned by the fertilizer and the sprouted plants eventually can access to the fertilizer/alkanoate mixture after the plants are established.

Thus, application of ACA® and other aqueous ammoniacal ionic solutions of metal alkanoates near plant roots has traditionally been limited by restrictions on placement of the carrier ammonia or other fertilizer liquids or solids. Despite this, and although the precise mechanism by which the aqueous ammoniacal ionic solution of metal alkanoates enhance plant growth is not completely understood, it appears that application of such solutions is especially important at early leafing stages of development of crops such as corn, soy beans and wheat.

It is against this background that the significant improvements and advancements of the present invention have taken place.

OBJECTS OF THE INVENTION

It is the principal object of the present invention to apply an aqueous ammoniacal ionic solution of metal alkanoates to seeds to stimulate seedling and later plant growth and to increase crop yields, without injury to seeds or plants.

It is a further object of the present invention to accomplish the aforementioned object without requiring the aqueous ammoniacal ionic solution of metal alkanoates be applied to the soil in a carrier medium such as anhydrous ammonia, liquid fertilizer, dry granular fertilizer or other medium.

It is a yet further object of the present invention to accomplish the aforementioned objects as early as possible in the development cycle of plants without risk of omitting an application of the aqueous ammoniacal ionic solution of metal alkanoates because of inclement weather.

SUMMARY OF THE INVENTION

In accordance with the major aspects of the present invention, an effective amount of an aqueous ionic ammoniacal ionic solution of metal alkanoates is applied directly to uncovered seeds, in-furrow, at planting. Following placement of the seeds in a furrow, typically in an automated fashion by a seed planting machine, the solution is automatically and continuously dispensed onto the uncovered seeds in-furrow and to the surface of the soil of the furrow, directly adjacent the seeds.

In an alternate embodiment of the present invention, seeds are treated before planting with an effective amount of an aqueous ammoniacal ionic solution of metal alkanoates.

Preferred alkanoates applied pursuant to the method of the present invention contain from two to six carbon atoms, with acetate ions most preferred. Preferred metal alkanoates contain agriculturally acceptable metals selected from the group consisting of boron, calcium, copper, iron, magnesium, manganese, molybdenum, potassium, sodium and zinc, with zinc particularly preferred. The most preferred solution with which the present invention may be practiced is an aqueous ammoniacal ionic solution of zinc acetate.

When applying an aqueous ammoniacal ionic solution of zinc acetate in-furrow to corn kernels in accordance with the present invention, the corn kernels are preferably placed in-furrow in 15" to 40" rows and the solution is preferably dispensed in-furrow at a rate of ⅓ pint to ½ pint per acre. When applying an aqueous ammoniacal ionic solution of zinc acetate in-furrow to soy bean seeds, the soy beans are placed in-furrow in 7" to 40" rows and the solution is dispensed in-furrow at a rate of ⅓ pint to ½ pint per acre. When applying an aqueous ammoniacal ionic solution of zinc acetate in-furrow to wheat seeds in accordance with the present invention, the wheat seeds are preferably placed in-furrow in 7" to 10" rows and the solution is preferably dispersed in-furrow at a rate of ⅓ pint to ½ pint per acre.

Employing the aforementioned methods results in stimulation of root growth to seedlings and post-emergent plants at the earliest developmental stages, increased plant growth in later stages, and increased crop yield, all without apparent injury to seeds or plants. The aforementioned methods have been employed under windy or wet weather conditions during which application of fertilizer by traditional pressure broadcast spray methods would typically be avoided.

A more complete appreciation of the present invention and its scope can be obtained from understanding the accompanying drawings, which are briefly summarized below, the following detailed description of presently preferred embodiments of the invention, and the appended claims.

DETAILED DESCRIPTION OF THE INVENTION

Figure 1:
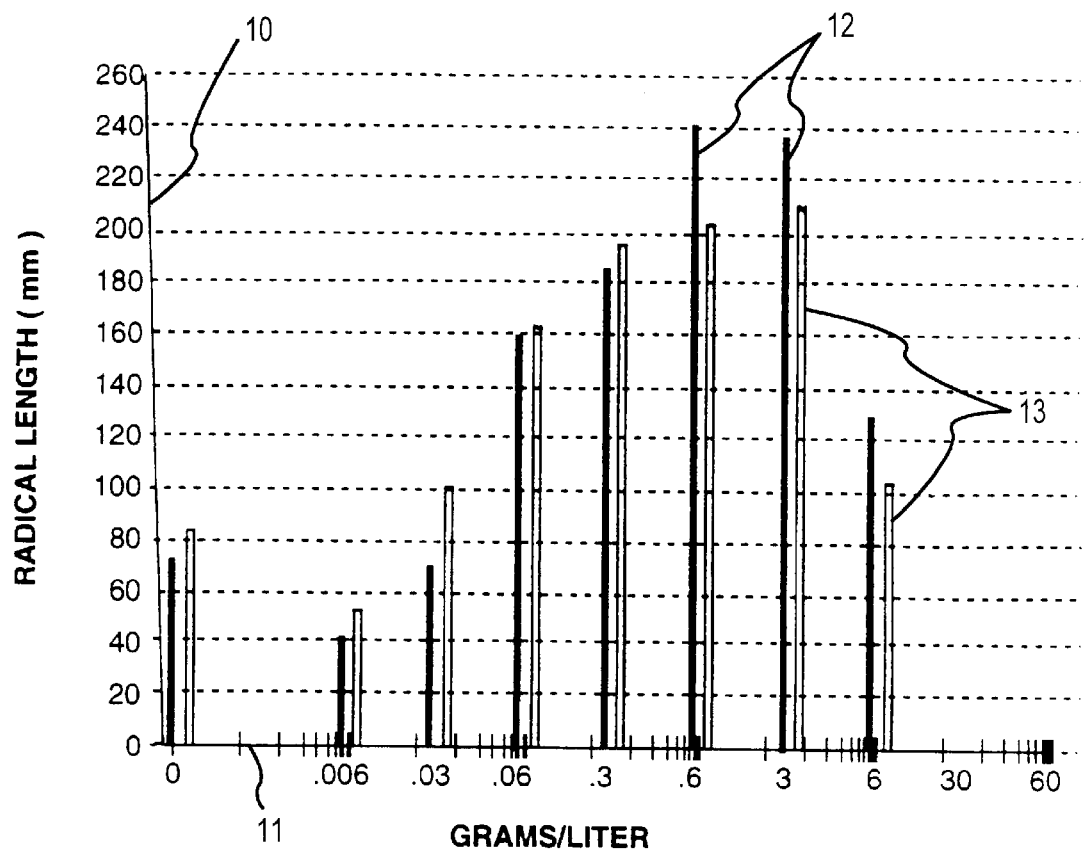
FIG. 1 is a graph on which data is plotted illustrating the radical length in millimeters of germinated corn kernels treated with an aqueous ammoniacal ionic solution of metal alkanoates.

In accordance with the present application, it has been discovered that aqueous ammoniacal ionic solutions of metal alkanoates can be successfully applied to seeds to stimulate root and plant growth, without burning or other injury to the seeds. In accordance with this discovery, a method of treating seeds with an aqueous ammoniacal ionic solution of metal alkanoates has been developed which results in increased root and plant growth. In addition, a method has been developed by which such solutions can be successfully applied to seeds in-furrow at seed planting at low delivery rates, without need for larger amounts of a carrier solution or material.

More particularly, it has been discovered that an aqueous ammoniacal ionic solution of zinc acetate can be applied directly to uncovered seeds in-furrow, and to the soil directly adjacent the seeds (that is to say, within ½" to the side of the center of the furrow) at planting, at rates of from ⅓ pint to ⅔ pint per acre, with beneficial effect to seed growth, early root growth, and subsequent plant development.

The method of the present invention preferably employs an aqueous ammoniacal ionic solution of metal alkanoates in which the alkanoate contains from two to six carbon atoms, with acetate ion most preferred. The metal of the aqueous ammoniacal ionic solution of metal alkanoates is an agriculturally acceptable metal selected from the group consisting of boron, calcium, copper, iron, magnesium, manganese, molybdenum, potassium, sodium and zinc, with zinc most preferred.

When applying an aqueous ammoniacal ionic solution of zinc acetate in-furrow to corn kernels in accordance with the present invention, the corn kernels are preferably placed in-furrow in 15" to 40" rows and the solution is preferably dispensed in-furrow at a rate of ⅓ pint to ½ pint per acre. When applying the solution in-furrow to soy bean seeds, the soy beans are placed in-furrow in 7" to 40" rows and the solution is dispensed in-furrow directly to the uncovered seeds and to the soil directly adjacent the seeds (at a distance of no more than ½" to the side of the center of the furrow) at a rate of ⅓ pint to ½ pint per acre. When applying an aqueous ammoniacal ionic solution of zinc acetate in-furrow to wheat seeds in accordance with the present invention, the wheat seeds are preferably placed in-furrow in 7" to 10" rows and the solution is preferably dispersed in-furrow at a rate of ⅓ pint to ½ pint per acre.

Application of aqueous ammoniacal ionic solutions of zinc acetate preferably contain zinc in a range of from 5% to 20% by weight, with a concentration of approximately 17% by weight zinc most preferred. An aqueous ammoniacal ionic solution of zinc acetate having a preferred zinc concentration can be produced according to Example I below.

EXAMPLE I

A stock solution of zinc acetate in aqueous ammonia was prepared by mixing 33.6 parts of glacial acetic acid with 48 parts of water followed by slow addition to the cooled mixture of 18.4 parts of commercial anhydrous liquid ammonia, while maintaining the temperature between 25° and 50° C. After cooling the solution to 10° C., 21.8 parts of zinc oxide were slowly added with stirring while maintaining the temperature below 25° C. The zinc oxide dissolved rapidly to afford a stock solution containing 17.5% weight percent zinc which had a pH of 11.4 and a specific gravity of 1.27.

Prior to the invention of the seed treatment method described herein, the phytotoxicity to seeds and the possible beneficial effects to seed growth of aqueous ammoniacal ionic solutions of metal alkanoates applied directly to seeds was unknown.

EXAMPLE II

To determine whether application of such solutions to seeds would cause undesirable phytotoxicity and to make a preliminary determination of concentrations which would optimally stimulate seed growth, batches of 50 field corn seeds were placed in petri dishes containing graduated concentrations of an aqueous ammoniacal ionic solution of zinc acetate prepared according to Example I above. The dishes contained concentrations of the solution of Example I to water of 0 g/l, 0.006 g/l, 0.03 g/l, 0.06 g/l, 0.3 g/l, 0.6 g/l, 3 g/l, 6 g/l, 30 g/l and 60 g/l. The seeds and solutions were maintained in the dishes for 48 hours.

After soaking in the petri dish solutions, each batch of 50 corn seeds was divided into smaller groups of seeds which were then placed on wet germination paper. Of each 50 seed batch, 25 of the seeds were placed on germination paper saturated with water and 25 of the seeds were placed on germination paper saturated with a solution containing 0.6 g of the aqueous ammoniacal ionic solution of zinc acetate of Example I per liter of water. Each saturated germination paper/seed set was placed in a separate plastic bag and sealed. The sealed bags were maintained in the dark in a large container at 80° F. for six days. At the end of six days, incubation was deemed complete. Radicle length, lateral root number, shoot length, seminal root number and seminal root length of each seed were measured. Data obtained for seeds incubated on germination paper saturated with the dilute aqueous ammoniacal ionic solution of zinc acetate solution is shown in Table I.

TABLE I

| Zinc Ammonia Acetate (Example I) in water | Radical Length (mm) | Lateral Root (number) | Shoot Length (mm) | Seminal Root Length (mm) | Seminal Root (number) |
|---|---|---|---|---|---|
| 60 g/l | 0.0 | 0.0 | 0.0 | 0.0 | 0.0 |
| 30 g/l | 0.0 | 0.0 | 0.0 | 0.0 | 0.0 |
| 6 g/l | 131.9 | 121.4 | 78.7 | 410.0 | 2.7 |
| 3 g/l | 232.6 | 155.5 | 143.1 | 371.7 | 2.5 |
| 0.6 g/l | 240.1 | 181.1 | 133.6 | 405.1 | 2.3 |
| 0.3 g/l | 185.9 | 173.5 | 105.8 | 422.2 | 3.1 |
| 0.06 g/l | 157.6 | 77.6 | 11.25 | 108.9 | 1.6 |
| 0.03 g/l | 75.7 | 56.4 | 80.4 | 107.7 | 1.7 |
| 0.006 g/l | 42.0 | 28.7 | 62.5 | 51.7 | 0.7 |
| 0 g/l | 70.5 | 52.8 | 72.3 | 62.1 | 1.0 |

The data summarized in Table I indicates that phytotoxicity of the aqueous ammoniacal ionic solution of zinc acetate of Example I is not fatal for solution concentrations of from 30 mg/l to 6 g/l water. Phytotoxicity appears fatal for seeds treated with concentrations of 30 g/l and above. Most significantly, a substantial and unexpected benefit was obtained from application of the aqueous ammoniacal ionic solution of zinc acetate to seeds in concentrations of from 0.06 g/l to 3 g/l zinc acetate solution of Example I to water. Within this concentration range, measured growth parameters generally increased with an increase in concentration of the aqueous ammoniacal ionic solution of zinc acetate. Above and below this concentration range, almost all measured growth parameters decreased. These tests evidence the significant effect of aqueous ammoniacal ionic solutions of metal alkanoates on the earliest seed growth.

Data obtained from the procedures described in Example I for seeds incubated on germination paper saturated with water only is shown in Table.II.

TABLE II

| Zinc Ammonia Acetate (Example I) in water | Radical Length (mm) | Lateral Root (number) | Shoot Length (mm) | Seminal Root Length (mm) | Seminal Root (number) |
|---|---|---|---|---|---|
| 60 g/l | 0.0 | 0.0 | 0.0 | 0.0 | 0.0 |
| 30 g/l | 0.0 | 0.0 | 0.0 | 0.0 | 0.0 |
| 6 g/l | 103.9 | 74.6 | 63.5 | 202.8 | 1.8 |
| 3 g/l | 214.2 | 184.0 | 123.3 | 381.3 | 2.2 |
| 0.6 g/l | 205.4 | 186.8 | 128.5 | 684.9 | 4.3 |
| 0.3 g/l | 189.9 | 142.5 | 122.6 | 323.7 | 2.8 |
| 0.06 g/l | 164.6 | 102.4 | 114.5 | 167.0 | 1.8 |
| 0.03 g/l | 99.2 | 70.5 | 92.0 | 124.6 | 1.6 |
| 0.006 g/l | 52.9 | 46.8 | 69.2 | 54.6 | 0.7 |
| 0 g/l | 83.3 | 64.7 | 84.2 | 95.8 | 1.6 |

The data summarized in Table II also indicates that phytotoxicity of aqueous ammoniacal ionic solutions is not fatal for solutions having concentrations of from 30 mg/l to 6 g/l of the aqueous ammoniacal ionic solution of zinc acetate of Example I to water. Phytotoxicity appears fatal for seeds treated with concentrations of 30 g/l and above, despite subsequent germination on water saturated paper. In a pattern similar to the results obtained with treated seeds germinated on paper saturated with dilute aqueous ammoniacal ionic solutions of zinc acetate, early seed growth clearly benefited from application of the aqueous ammoniacal ionic solutions of zinc acetate in concentrations of from 0.06 g/l to 3 g/l to water. Within this concentration range, most measured growth parameters increased with an increase in concentration. Above and below this concentration range, almost all measured growth parameters decreased. The exceptional results obtained in all measured parameters with seeds treated with 0.6 g aqueous ammoniacal ionic solution of zinc acetate per liter of water indicates that this concentration may be indicative of an optimum treatment range.

The graph shown in FIG. 1 compares radical lengths of seeds treated with various concentrations of the aqueous ammoniacal ionic solution of zinc acetate and germinated on paper saturated with a dilute solution of the aqueous ammoniacal ionic solution of zinc acetate (data from Table I) with treated seeds germinated on water saturated paper (data from Table II). The vertical axis 10 represents radical length, in millimeters. The horizontal axis 11 represents the various concentrations of the aqueous ammoniacal ionic solution of zinc acetate prepared according to Example I with which the seeds were treated. Solid vertical bars 12 represent the radical length of treated seeds germinated in the dilute aqueous ammoniacal ionic solution of zinc acetate (Table I). Hollow vertical bars 14 represent the radical length of treated seeds germinated in water (Table II). As can be seen in FIG. 1, maximum radical length is effected with seeds treated with from 0.06 to 3.0 g/l of the aqueous ammoniacal ionic solution of zinc acetate of Example I to water, whether the treated seeds are germinated in a dilute aqueous ammoniacal ionic solution of zinc acetate or in water.

Figure 2:
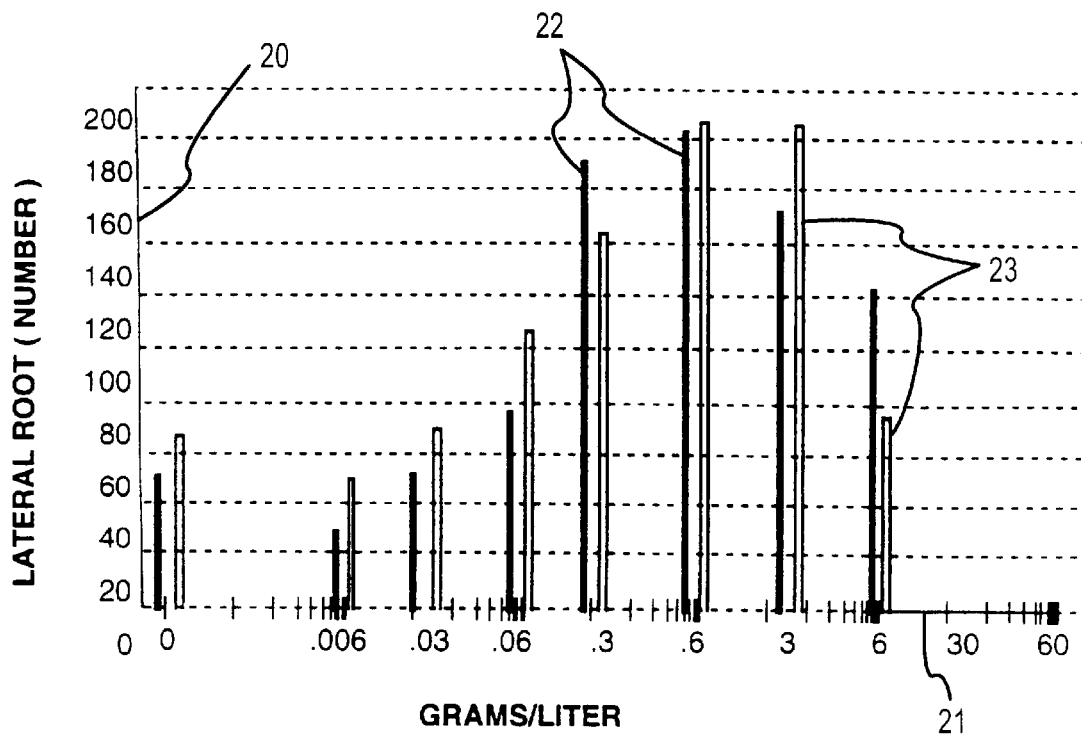
FIG. 2 is a graph on which data is plotted illustrating the number of lateral roots present on germinated corn kernels treated with an aqueous ammoniacal ionic solution of metal alkanoates.

The graph shown in FIG. 2 compares numbers of lateral roots formed on seeds treated with various concentrations of the aqueous ammoniacal ionic solutions of zinc acetate and germinated on paper saturated with a dilute aqueous ammoniacal ionic solution of zinc acetate (data from Table I) with seeds treated and then germinated on water saturated paper (data from Table II). The vertical axis 20 represents numbers of lateral roots formed. The horizontal axis 21 represents the various concentrations of the aqueous ammoniacal ionic solutions of zinc acetate solution prepared according to Example I with which the seeds were treated. Solid vertical bars 22 represent the number of lateral roots formed on treated seeds germinated in a dilute aqueous ammoniacal ionic solution of zinc acetate (Table I). Hollow vertical bars 24 represent the number of lateral roots formed on treated seeds germinated in water (Table II). As can be seen in FIG. 2, maximum number of lateral roots formed occurs with seeds treated with from 0.3 to 3.0 g/l of the aqueous ammoniacal ionic solution of zinc acetate of Example I to water, whether the treated seeds are germinated in a dilute aqueous ammoniacal ionic solution of zinc acetate or in water.

Figure 3:
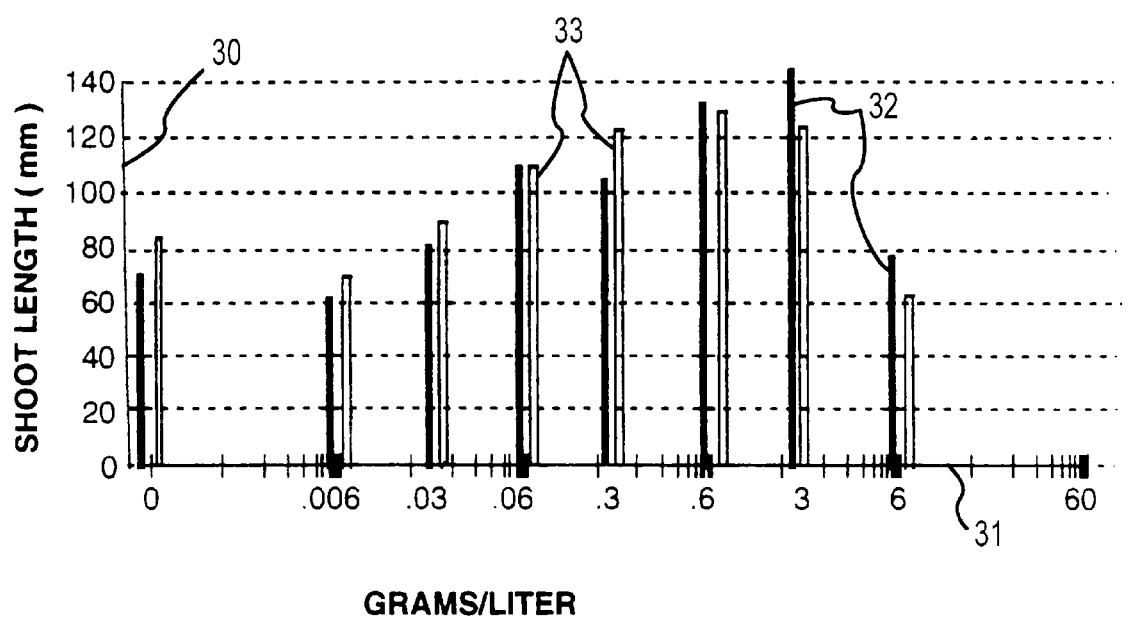
FIG. 3 is a graph on which data is plotted illustrating the shoot length in millimeters of germinated corn kernels treated with an aqueous ammoniacal ionic solution of metal alkanoates.

The graph shown in FIG. 3 compares shoot lengths of seeds treated with various concentrations of the solution of Example I and germinated on paper saturated with a dilute zinc acetate solution of Example I (data from Table I) with seeds treated and then germinated on water saturated paper (data from Table II). The vertical axis 30 represents shoot length, in millimeters. The horizontal axis 31 represents the various concentrations of the Example I solution with which the seeds were treated. Solid vertical bars 32 represent the shoot length of treated seeds germinated in the dilute zinc ammonium acetate solution (Table I). Hollow vertical bars 34 represent the shoot length of treated seeds germinated in water (Table II). As can be seen in FIG. 3, maximum shoot length is effected with seeds treated with from 0.06 to 3.0 g/l of the aqueous ammoniacal ionic solution of zinc acetate of Example I to water, whether the treated seeds are germinated in a dilute aqueous ammoniacal ionic solution of zinc acetate or in water.

Figure 4:
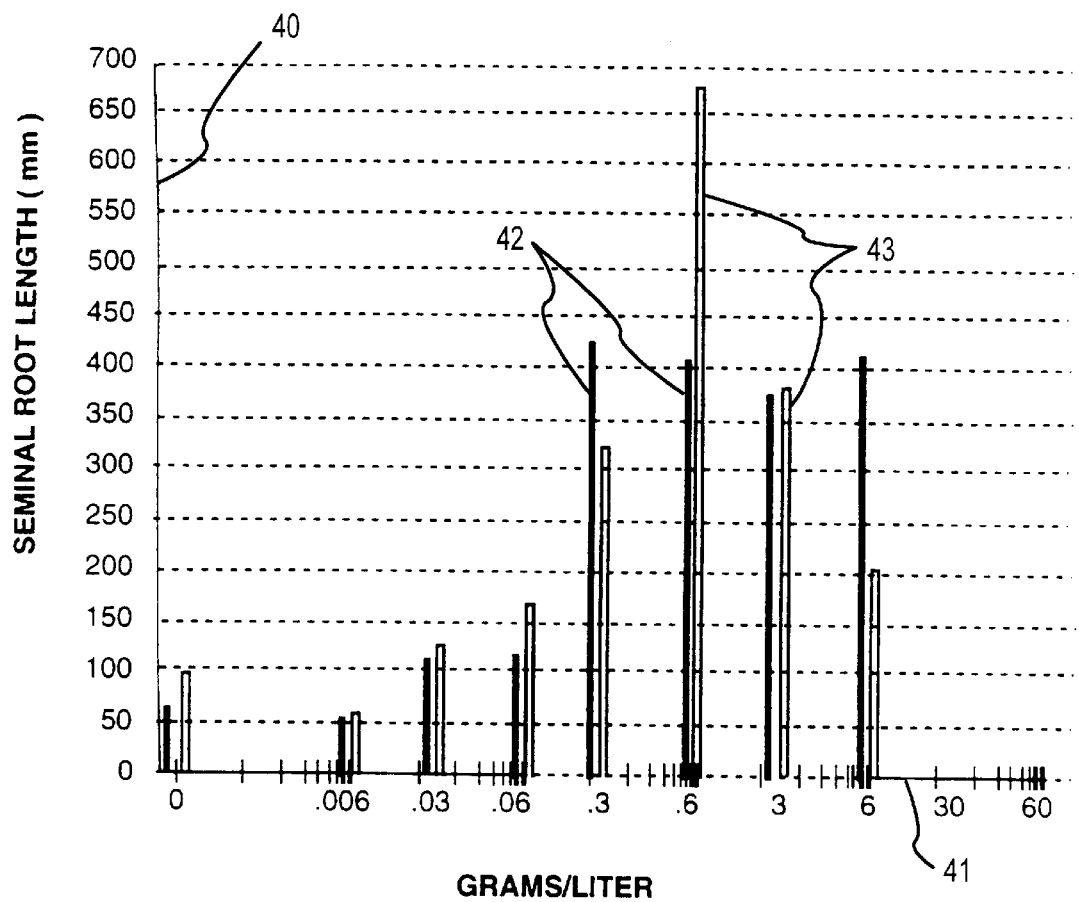
FIG. 4 is a graph on which data is plotted illustrating the seminal root length in millimeters of germinated corn kernels treated with an aqueous ammoniacal ionic solution of metal alkanoates.

The graph shown in FIG. 4 compares seminal root lengths of seeds treated with various concentrations of the solution of Example I and germinated on paper saturated with a dilute aqueous ammoniacal ionic solution of zinc acetate (data from Table I) with seeds treated and then germinated on water saturated paper (data from Table II). The vertical axis 40 represents seminal root length, in millimeters. The horizontal axis 41 represents the various concentrations of the solution of Example I with which the seeds were treated. Solid vertical bars 42 represent the seminal root length of treated seeds germinated in the dilute zinc acetate solution of Example I (Table I). Hollow vertical bars 44 represent the shoot length of treated seeds germinated in water (Table II). As can be seen in FIG. 4, maximum seminal shoot length is effected with seeds treated with from 0.3 to 3.0 g/l of the aqueous ammoniacal ionic solution of zinc acetate of Example I to water, whether the treated seeds are germinated in a dilute aqueous ammoniacal ionic solution of zinc acetate or in water. The outstanding results obtained with seeds treated with 0.6 g/l of the solution of Example I to water (i.e., mean seminal root length of 684.9 mm per Table II) which were subsequently germinated in a water saturated environment indicates that seed growth stimulation resulting from initial seed treatment, as indicated by seminal root length, may benefit from access to pure water during germination.

Figure 5:
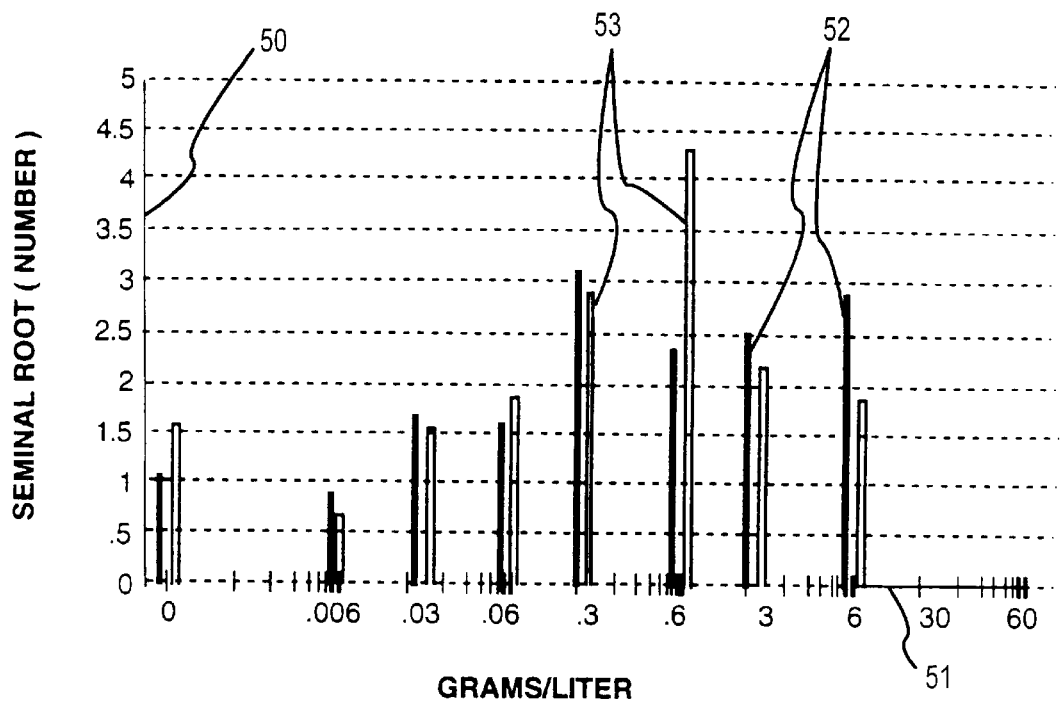
FIG. 5 is a graph on which data is plotted illustrating the number of seminal roots present on germinated corn kernels treated with an aqueous ammoniacal ionic solution of metal alkanoates.

The graph shown in FIG. 5 compares numbers of seminal roots formed on seeds treated with various concentrations of the aqueous ammoniacal ionic solution of zinc acetate of Example I and germinated on paper saturated with a dilute aqueous ammoniacal ionic solution of zinc acetate (data from Table I) with seeds treated and then germinated on water saturated paper (data from Table II). The vertical axis 50 represents the average number of seminal roots formed. The horizontal axis 51 represents the various concentrations of the solution of Example I to water with which the seeds were treated. Solid vertical bars 52 represent the number of seminal roots formed on treated seeds germinated in the dilute aqueous ammoniacal ionic solution of zinc acetate (Table I). Hollow vertical bars 54 represent the number of seminal roots formed on treated seeds germinated in water (Table II). As can be seen in FIG. 5, the maximum number of lateral roots formed on seeds treated with from 0.3 to 6.0 g/l of the aqueous ammoniacal ionic solution of zinc acetate of Example I to water, whether the treated seeds are germinated in a dilute aqueous ammoniacal ionic solution of zinc acetate or in water. In addition, the noteworthy results obtained with seeds treated with 0.6 g/l of the solution of Example I to water (i.e., average 4.3 lateral roots formed per Table II) which were subsequently germinated in a water saturated environment indicates that seed growth stimulation resulting from initial seed treatment, as indicated by seminal root number, may benefit from access to pure water during germination.

EXAMPLE III

Field tests were conducted to determine the effect of aqueous ammoniacal ionic solutions of zinc acetate treatment on early plant growth. Corn seeds were placed in petri dishes containing the aqueous ammoniacal ionic solution of zinc acetate prepared in accordance with the Example I diluted in water in the following proportions: 0 g/l, 0.006 g/l, 0.03 g/l, 0.06 g/l, 0.3 g/l, 0.6 g/l, 3 g/l, 6 g/l, 30 g/l and 60 g/l. Seeds remained in the solutions in the petri dishes for 24 to 48 hours, after which they were planted in 30 inch rows, 2" deep and 8" apart. Viability (as measured in percent of plants successfully emerging) and stem diameter (in millimeters) were measured. Data obtained is summarized in Table III.

TABLE III

| Zinc Ammonia Acetate | Emergence (% of plants sprouted) | Stem Diameter (mm) |
|---|---|---|
| 60 g/l | 0 | 0 |
| 30 g/l | 0 | 0 |
| 6 g/l | 23 | 6.5 |
| 3 g/l | 85 | 7.7 |
| 0.6 g/l | 95 | 8.8 |
| 0.3 g/l | 97 | 8.7 |
| 0.06 g/l | 93 | 8.4 |
| 0.03 g/l | 93 | 8.5 |
| 0.006 g/l | 96 | 7.8 |
| 0 g/l | 92 | 7.8 |

As may be seen in Table III, satisfactory plant emergence and stem growth occurred with seeds treated with an aqueous ammoniacal ionic solution of zinc acetate prepared in accordance with Example I and diluted in water in from 0 g/l to 3 g/l. Seeds treated with 30 g/l of the solution of Example I to water and above succumbed. Plant viability of seeds treated with 6 g/l of the solution of Example I to water is uncertain.

To treat seeds in the field with the preferred smaller volumes of aqueous ammoniacal ionic solutions of metal alkanoates (for example, ⅓ pint to ⅔ pint per acre), low fluid delivery rates must be maintained. However, as mentioned previously, application of such solutions at low delivery rates is difficult. Foreign particles tend to occlude small dispensing orifices otherwise required to dispense solutions at such low rates. Variations in ambient temperature effect the viscosity of such solutions, which results in unacceptable variation in fluid delivery rates.

Despite the fluid delivery problems described above, a method of applying aqueous ammoniacal ionic solutions of metal alkanoates to seeds in-furrow has been developed. This method is best understood with reference to the component parts of an in-furrow pumping and dispensing assembly 60 (FIGS. 6 through 10) attached to a planting machine 62 (FIG. 6) suitable for planting corn, soy beans, wheat and other seeds.

Figure 6:
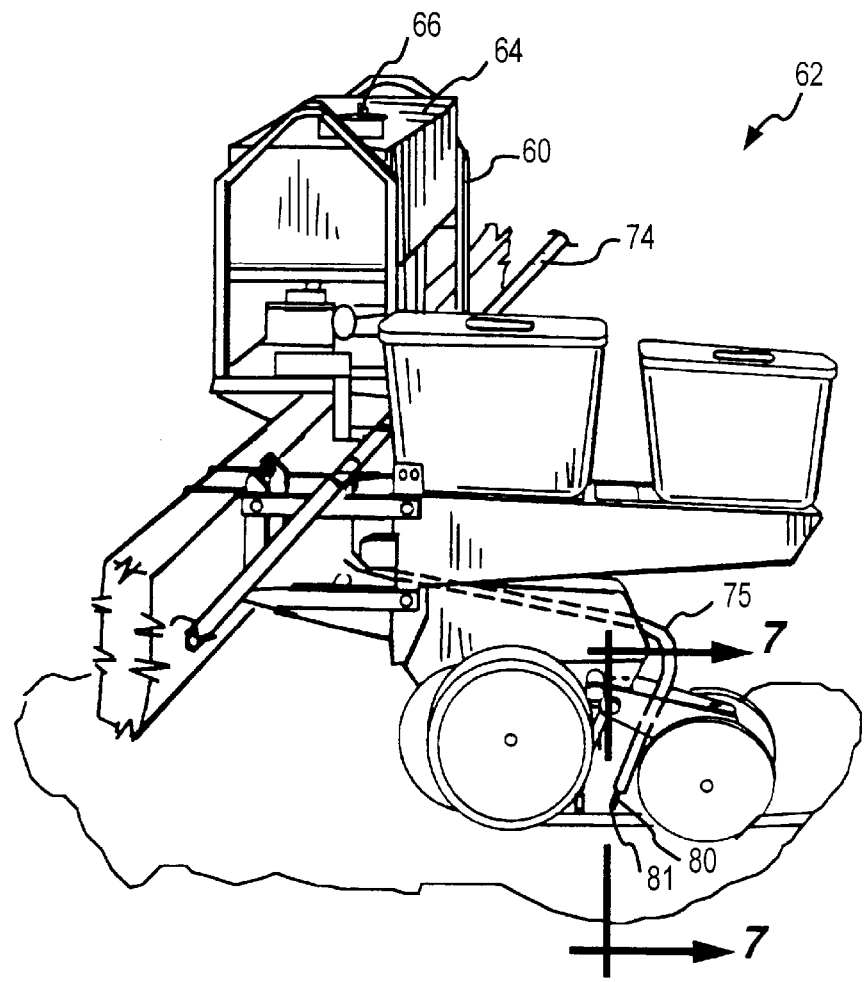
FIG. 6 is a perspective view of a corn planting machine on which is mounted an in-furrow pumping assembly with which the present invention may be practiced.
Figure 7:
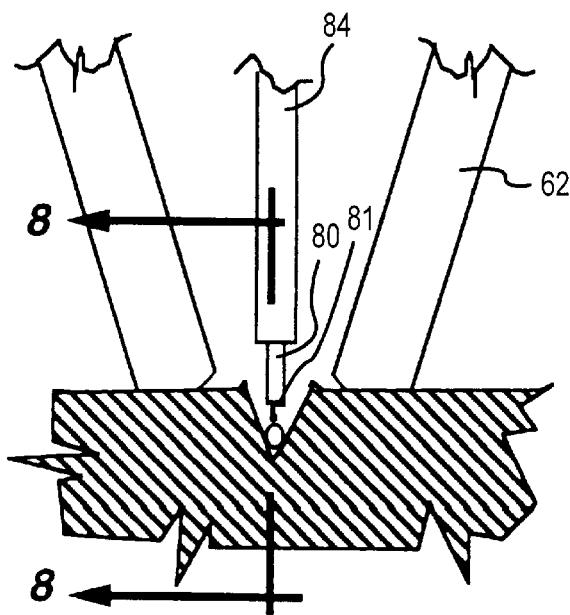
FIG. 7 is a schematic section view of the corn planting machine shown in FIG. 6 showing application of a solution to a seed in a furrow with the in-furrow pumping assembly shown in FIG. 6, taken substantially along the line 7—7 of FIG. 6.
Figure 8:
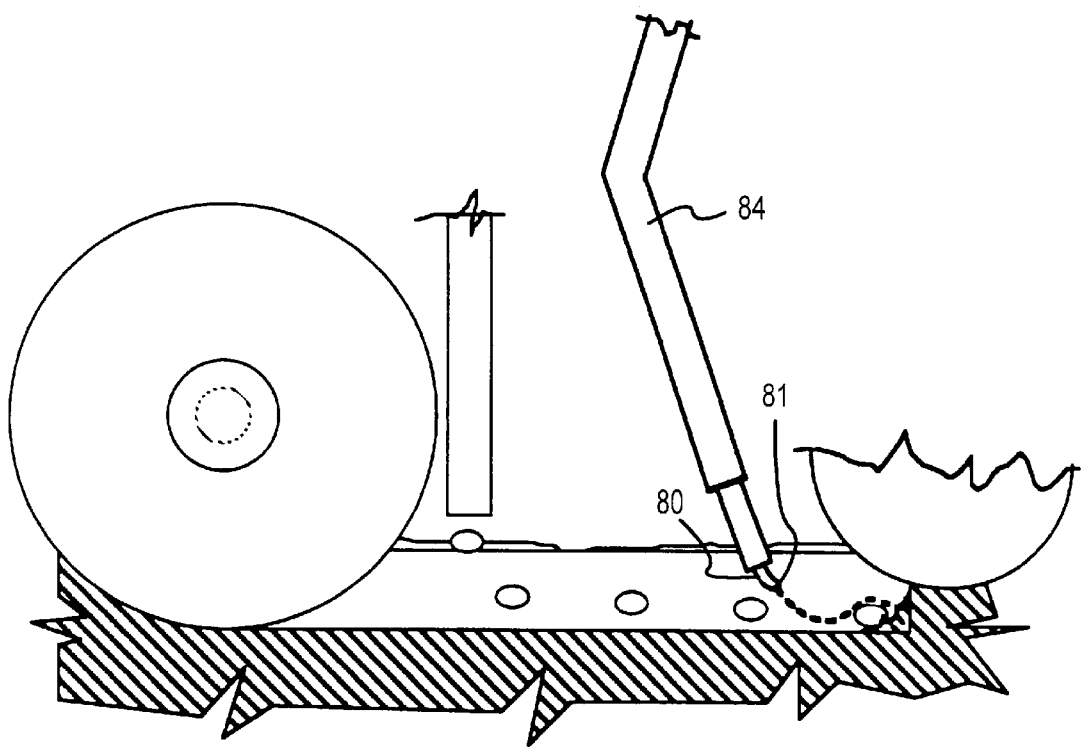
FIG. 8 is a schematic section view of the corn planting machine shown in FIGS. 6 and 7, taken substantially along the line 8—8 of FIG. 7.
Figure 10:
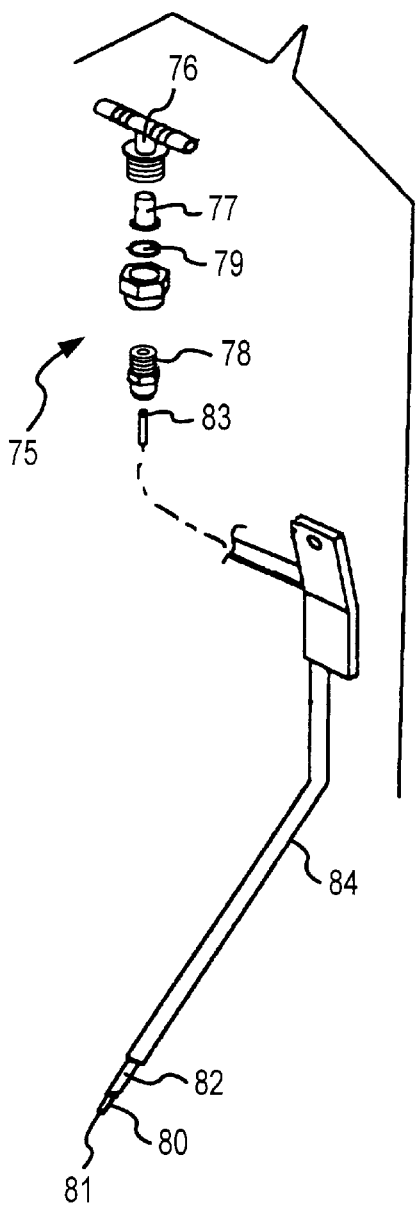
FIG. 10 is an exploded view of a drop tube assembly which is a component of the in-furrow pumping assembly shown in FIG. 9.
Figure 9:
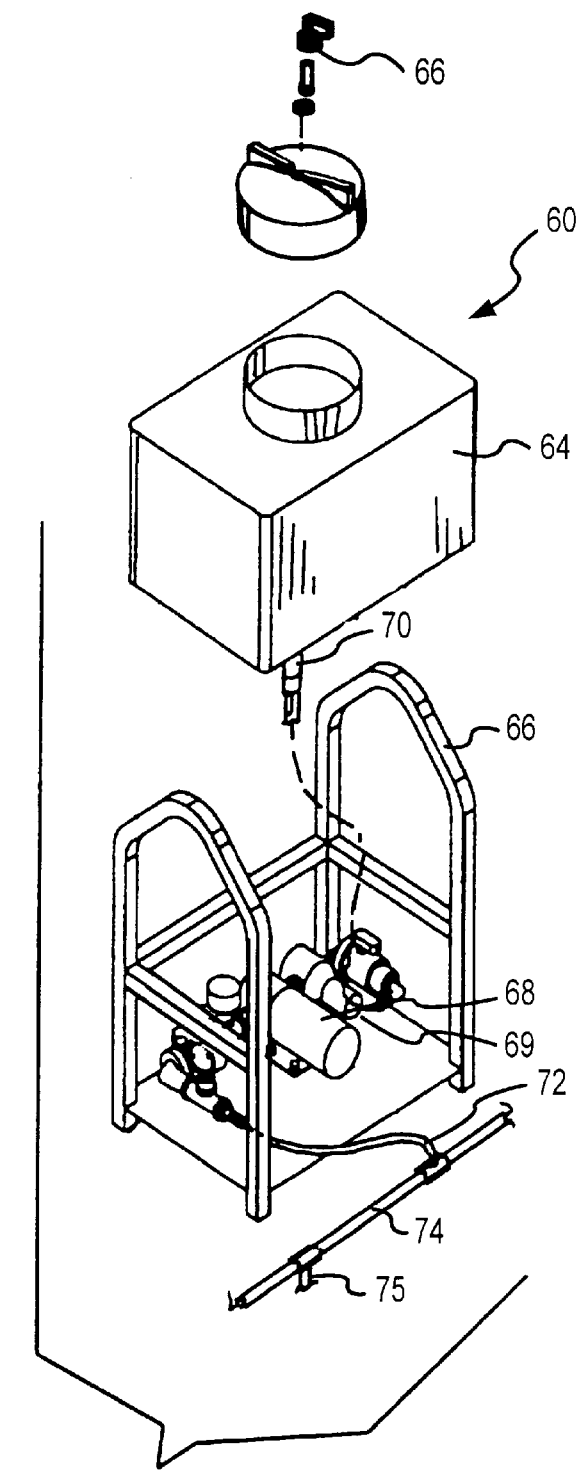
FIG. 9 is a partially exploded view of components of the in-furrow pumping assembly shown in FIG. 6.

As is shown in FIGS. 6, 9 and 10, a tank 64 holding an aqueous ammoniacal ionic solution of metal alkanoates is mounted to a frame 66 attached to the planting machine 62. The tank 64 includes a control vent 66 to prevent excessive vapor/air exchange when liquid is present in the tank 64. A pump 68 is also mounted to the frame 66. A screen 69 filters foreign material from the solution before it enters the pumping system. Tubing 70 connects the tank 64 to the pump 68 and tubing 72 connects the pump 68 to a manifold 74. The manifold 74 is connected to drop tube subassemblies 75, through which liquid is dispensed to the furrows (FIGS. 7 and 8).

As is best shown in FIG. 10, each drop tube subassembly 75 includes a nozzle body 76 and coupler 78 between which is mounted a ball check valve screen 77 and an orifice plate 79. Mounted in the coupler 78 is a microtubing 80 having first and second open ends 81 and 83 and further having a preferred inside diameter of 0.035"–0.075". The microtubing 80 is mounted in conduit 82 having a preferred diameter of 0.50". The conduit 82 is mounted in a stainless steel drop tube 84, which extends in a downward direction and terminates adjacent to but spaced approximately 2" to 4" above the soil surface (FIG. 7).

During planting, the in-furrow pumping and dispensing assembly 60 is operated continuously, dispensing liquid at a preferred rate of ½ pint of the aqueous ammoniacal ionic solution of metal alkanoates per acre. Despite foreign particles in the product supply tank, the preferred rate is maintained by the combination of the special in-line check valve screen 77 and orifice plate 79, which functions as a metering orifice. It has been further discovered that maintenance of the preferred liquid dispensing rate requires the microtubing 80 be kept as straight as possible, avoiding unnecessary bending.

EXAMPLE IV

Forty-eight 1200' rows 30" apart were planted with corn to which ½ pint per acre of the aqueous ammoniacal ionic solution of zinc acetate prepared in accordance with the method of Example I, was applied with to the uncovered seeds and to the surface of the furrow directly adjacent the seeds (to a distance of at most ½" to the side of the center of the furrow) with an in-furrow pumping and dispensing assembly 60 attached to a planting machine 62 as described above. Thirty-six check rows 1200' long and 30" apart were planted with corn to which no Example I solution was applied. The treated rows yielded 193.5 bushels of corn per acre, while the check rows yielded 185.7 bushels of corn per acre. This represents an increased yield of 7.8 bushels of corn per acre.

EXAMPLE V

Ninety-six 560' rows 30" apart were planted with corn to which ½ pint per acre of the aqueous ammoniacal ionic solution of zinc acetate prepared in accordance with Example I was applied to the uncovered seeds, in-furrow, and to the surface of the furrow directly adjacent the seeds, to a distance of at most ½" to the side of the center of furrow, with the in-furrow pumping and dispensing assembly 60 attached to a planting machine 62 as described above. Ninety-six check rows 560' long by 30" apart were planted with corn to which no Example I solution was applied. The treated rows yielded 147.2 bushels of corn per acre, while the check rows yielded 143.9 bushels of corn per acre. This represents an increased yield of 3.3 bushels of corn per acre.

It is has been further discovered that the aqueous ammoniacal ionic solution of zinc acetate of Example I may be mixed with an insecticide and applied directly to seeds, in-furrow, using the in-furrow pumping and dispensing assembly 60 shown in FIGS. 6 through 10. One illustrative example of application of such a mixture is described in Example VI below.

EXAMPLE VI

A solution prepared in accordance with Example I, was mixed with Furadan, an insecticide available from FMC Corporation, and applied directly to uncovered seeds, and to the surface of the furrow directly adjacent the seeds, to a distance of at most ½" to the side of the center of the furrow, in-furrow to corn at planting at a rate of ⅔ pint of the zinc acetate solution of Example I per acre. The row treated with the aqueous ammoniacal ionic solution of zinc acetate/insecticide composition yielded 120 bushels of corn per acre. Check rows to which only the insecticide was applied yielded 93.8 bushels of corn per acre. The yield of rows treated with the aqueous ammoniacal ionic solution of zinc acetate/insecticide composition represent an increased yield of 28% over the rows treated only with insecticide. This increased yield is not believed to be attributable solely to the solitary effects of the aqueous ammoniacal ionic solution of zinc acetate, but rather is believed to evidence a synergistic effect between the zinc acetate solution and the insecticide.

The aforementioned methods have been employed under windy weather conditions during which application of fertilizer by traditional broadcast spray methods would typically be avoided.

Presently preferred embodiments of the present invention and many of its improvements have been described with a degree of particularity. It should be understood that this description has been made by way of preferred examples, and that the invention is defined by the scope of the following claims.

What is claimed is:

1. A method of stimulating root growth of seedlings comprising the steps of:

positioning a plurality of uncovered seeds in a furrow on the surface of the soil of the furrow;

applying directly to the uncovered seeds in the furrow and to the furrow immediately adjacent the seeds in an unatomized form an effective amount of an aqueous ammoniacal ionic solution of a metal alkanoates, said solution containing alkanoate ions having from 2 to 6 carbon atoms each; and covering the seeds with soil.

2. The method of claim 1 wherein the aqueous ammoniacal ionic solution of metal alkanoates contains metal selected from the group consisting of boron, calcium, copper, iron, magnesium, manganese, molybdenum, potassium, sodium and zinc.

3. The method of claim 1 wherein the solution is an aqueous ammoniacal ionic solution of zinc acetate.

4. The method of claim 3 wherein the solution contains from 5% to 20% by weight zinc.

5. The method of claim 4 wherein the solution is applied at a rate of from ⅓ pint to ⅔ pint per acre.

6. The method of claim 4 wherein the solution contains approximately 15% by weight zinc and approximately 17% by weight nitrogen and is applied at a rate of approximately ⅓ pint to ⅔ pint per acre.

7. The method of claim 2 further comprising the step of:

mixing an effective amount of an insecticide solution with the solution prior to the applying step.

8. A method of treating seeds prior to planting comprising the step of applying directly to the seeds an effective amount of an aqueous ammoniacal ionic solution of metal alkanoates containing alkanoate ions of from 2 to 6 carbon atoms each.

9. The method of claims 8 wherein the metal of the solution is selected from the group consisting of boron, calcium, copper, iron, magnesium, manganese, molybdenum, potassium, sodium and zinc.

10. The method of claim 8 wherein the solution is an aqueous ammoniacal ionic solution of zinc acetate.

11. The method of claim 10 wherein the zinc solution contains from 5% to 10% by weight zinc.

12. A method of treating seeds at planting to stimulate root growth of seedlings germinating therefrom, the method employing a seed planting machine having a liquid dispenser having a tank, a pump, a microtubing having first and second open ends and specially adapted to be in fluid communication with said tank at least part of the time during planting, the method comprising the steps of:

supplying an effective amount of an aqueous ammoniacal ionic solution of metal alkanoates to the tank, said solution containing alkanoate ions of from 2 to 6 carbon ions each;

pumping the solution from said tank to said microtubing and out said first end of said microtubing;

depositing said seeds in a furrow;

applying said solution in an unatomized form directly to the seeds in the furrow; and covering said seeds with soil.

13. The method of claim 12 wherein the solution is an aqueous ammoniacal ionic solution of zinc acetate.

14. The method of claim 13 wherein the solution contains from 5% to 20% by weight zinc.

15. The method of claim 14 wherein the solution is applied at a rate of from ⅓ pint to ⅔ pint per acre.

16. The method of claim 12 wherein the solution contains metal ions selected from the group consisting of boron, calcium, copper, iron, magnesium, manganese, molybdenum, potassium, sodium and zinc.

17. The method of claim 16 further comprising the step of:

mixing an insecticide solution with the aqueous ammoniacal ionic solution of metal alkanoates prior to the applying step.

* * * * *